(12) United States Patent
Certain (10) Patent No.: US 7,907,066 B2
(45) Date of Patent: Mar. 15, 2011

(54) METHOD AND A DEVICE FOR DETECTING AND SIGNALING THAT A ROTORCRAFT IS APPROACHING THE VORTEX DOMAIN

(75) Inventor: Bernard Certain, Aix en Provence (FR)

(73) Assignee: Eurocopter, Marignane Codex (FR)

( * ) Notice: Subject to any disclaimer, the term of this patent is extended or adjusted under 35 U.S.C. 154(b) by 399 days.

(21) Appl. No.: 12/238,896

(22) Filed: Sep. 26, 2008

(65) Prior Publication Data

US 2009/0089006 A1    Apr. 2, 2009

(30) Foreign Application Priority Data

Sep. 27, 2007    (FR) .................................... 07 06785

(51) Int. Cl.
*G08B 21/00*    (2006.01)
(52) U.S. Cl. .................. 340/946; 73/178 H; 244/17.11; 340/945; 340/963; 340/968; 701/9; 701/14; 702/144
(58) Field of Classification Search .................. 340/945, 340/946, 963, 966, 968; 73/178 H; 702/144, 702/96; 701/9, 14; 244/17.11, 17.13
See application file for complete search history.

(56) References Cited

U.S. PATENT DOCUMENTS

| | | | |
|---|---|---|---|
| 3,373,605 A | | 3/1968 | Beilman |
| 6,683,541 B2* | | 1/2004 | Staggs et al. .................. 340/961 |
| 6,880,782 B2* | | 4/2005 | Kisor .......................... 244/17.13 |
| 7,411,519 B1* | | 8/2008 | Kuntman et al. ............. 340/968 |
| 2003/0222795 A1* | | 12/2003 | Holforty et al. .............. 340/968 |

FOREIGN PATENT DOCUMENTS

WO    2004/101358 A    11/2004

OTHER PUBLICATIONS

Varnes, David J., "Development of a Helicopter Vortex Ring State Warning System Through a Moving Map Display Computer", THESIS, Sep. 1, 1999, XP009100651, pp. 1-135.
Johnson, Wayne, "Model for Vortex Ring State Influence on Rotorcraft Flight Dynamics", NASA Technical Pulbication, No. 2005-213477, Dec. 2005, XP002481739, pp. 1-64.

* cited by examiner

*Primary Examiner* — Brent Swarthout
(74) *Attorney, Agent, or Firm* — Brooks Kushman P.C.

(57) ABSTRACT

A method and a device (D) for detecting and signaling the approach to a vortex domain by a rotorcraft, the device includes:
- first elements (1) for measuring the instantaneous vertical speed v of a rotorcraft;
- second elements (2) for measuring the instantaneous proper airspeed $V_P$ of a rotorcraft;
- third elements (3) constituting a database BDD relating to representing at least one instantaneous vortex domain;
- fourth elements (4) connected via first, second, and third connections (11, 12, 13) respectively to the first, second, and third elements, the fourth elements being designed to detect the approach to a vortex domain by the rotorcraft; and
- fifth elements (5) for signaling the approach to a vortex domain by the rotorcraft, the fifth elements being connected to the fourth elements (4) via a connection (14).

31 Claims, 2 Drawing Sheets

METHOD AND A DEVICE FOR DETECTING AND SIGNALING THAT A ROTORCRAFT IS APPROACHING THE VORTEX DOMAIN

The present invention relates to a method and to a device for detecting and signaling that a rotorcraft, in particular of the helicopter type, is approaching the vortex domain.

More particularly, said detection and signaling method and device are intended to inform the pilot of a rotorcraft that said rotorcraft is close, or even entering a flight domain generally referred by the person skilled in the art as the "vortex state".

BACKGROUND OF THE INVENTION

A rotorcraft, sometimes referred to a rotary wing aircraft, is fitted with a main rotor (possibly a plurality of main rotors) of substantially vertical axis and of large diameter that provide all or part of its lift.

In the helicopter configuration, the main rotor, which is driven by at least one engine, serves both to provide lift and propulsion. In principle, a helicopter also has an auxiliary rotor, referred to as a tail rotor or an "anti-torque" rotor for controlling the aircraft in yaw.

More precisely, the main rotor is constituted by some number of blades that may be considered as wings of large aspect ratio, and that are driven to rotate.

The blades are attached to a central portion of the rotor known as the "hub".

At least one engine delivers mechanical power to the main and tail rotors, and also to auxiliary members.

The engine is generally a turbine engine. Given the number of revolutions at the outlet from a turbine is of the order of 30,000 revolutions per minute (rpm), which amounts to about 500 revolutions per second (rps), whereas the number of revolutions of the main rotor is of the order of 300 rpm, transmitting power from the turbine to the main rotor requires a speed-reducing unit to be interposed between them that is referred to as the main gearbox (MGB).

An outlet shaft from the MGB thus serves in particular to drive the main rotor and thus the blades via the hub.

Under these conditions, a rotorcraft carries out three kinds of flight, in principle:

vertical flight, upwards or downwards;
hovering flight, the aircraft remaining stationary relative to the air; and
flight in horizontal or sloping translation.

In vertical flight, the resultant aerodynamic force and the weight comprise two forces acting in opposite directions on the same axis: flight is up or down depending on whether the aerodynamic force is greater than or less than the weight of the aircraft.

Hovering corresponds to the stationary aircraft being in equilibrium while subjected to two forces that are equal and opposite, i.e. the resultant aerodynamic force and the weight of the aircraft.

Flying in translation corresponds to a normal possibility for aircraft that are to move through the air: this feature is not specific to rotorcraft but it differs from the way airplanes fly.

In practice, the invention relates to a rotorcraft while in downward flight.

Under such circumstances, the flow of air generated by the main rotor differs depending on whether the aircraft is descending fast, moderately, or slowly.

Fast and moderate downward flight takes place under "non-powered" conditions: power is delivered by the stream of air and a freewheel is interposed in the power transmission assembly so as to enable the rotor to turn freely.

In contrast, slow downward flight takes place under powered conditions, the pilot causing the rotorcraft to descend under control by reducing the collective pitch of the blades of the main rotor.

The invention relates more specifically to slow downward flight of a rotorcraft, where such descent may take place vertically or else along a flight path having a steep slope, i.e. with the rotorcraft having a certain amount of forward horizontal speed referred to as instantaneous proper airspeed $V_P$, this instantaneous proper speed remaining within a range of values that are relatively low, and being associated with an instantaneous vertical speed v.

During slow downward flight, and as explained below, a wake forms at the bottom portion of the main rotor, thereby constraining the bottom central streamlines of air to turn downwards and the top central streamlines of air to create a turbulent zone towards the periphery of the blades. The aerodynamic flow is thus disturbed and there is thus a risk of peripheral vortexes developing and completely isolating the plane of the rotor. This dangerous phenomenon, known as the "vortex state" leads to a general loss of lift and controllability.

In other words, when a rotorcraft begins to descend at a slow speed, the stream of air that, in translation flight, normally passes through the rotor in an upward direction runs the risk of being reversed and prevented from passing through the rotor, whether upwards or downwards: the blades then work in their own wash and the surrounding air forms a "vortex ring" in the vicinity of the main rotor.

A physical interpretation of the phenomenon is that on going downwards in this way the rotor "swallows up" its own wake, thereby explaining the turbulent nature of the flow observed under such circumstances.

Consequently, this mode of operation is characterized by the air above the rotor separating, giving rise to a wake.

The vortex ring generally develops when the helicopter is flying at a vertical speed close to the speed induced by the rotor, i.e. about 10 meters per second (m/s), in association with a low speed in translation: a large portion of the rotor is then in a stall zone, the various blade elements then working at an angle of incidence that is relatively high. While moving in translation at a speed that is moderate or high, the wash from the rotor is disposed of rearwards, such that the vortex state does not occur.

The vortex regime is dangerous, but the pilot can easily escape therefrom, either by beginning to move in translation (using the cyclic pitch control of the rotor blades), or by increasing the vertical speed (reducing the general pitch of the rotor blades) in order to cause the wash to disappear from the rotor.

For example, document U.S. Pat. No. 6,880,782 describes a device seeking to act on the rotor of a rotorcraft so as to escape from the vortex domain. Nevertheless, that type of device does not make it possible to prevent a rotorcraft from entering into the vortex domain. It does no more than correct a situation that is potentially dangerous, but it does not avoid such a situation occurring.

Furthermore, the document "Development of a helicopter vortex ring state warning system through a moving map display computer" by David Varnes relates to a rotorcraft approaching the vortex domain.

OBJECTS AND SUMMARY OF THE INVENTION

An object of the present invention is to propose a method and a device for detecting that a rotorcraft is entering into a vortex state and for informing a pilot, or indeed, predictively, for detecting that the rotorcraft is approaching said vortex state, so as to enable the above-mentioned drawbacks inherent to such flight situations to be remedied.

To this end, the method of the invention is remarkable wherein it includes the following steps:

a) making a series of prior measurements on a reference rotorcraft of the particular type of rotorcraft during preliminary flights by measuring a plurality of pairs of values relating to the tangential and normal components of the speed of the flow of air relative to the plane of the rotor, these pairs of values determining at least one instantaneous vortex representative of a vortex state by means of at least one diagram in which the abscissa axis and the ordinate axis correspond respectively to said tangential and normal components;

b) during flight of a rotorcraft of said particular type of rotorcraft, determining in real time a predictive proper airspeed $V_{PP}$ of said rotorcraft and an associated predictive vertical speed $v_{AP}$, i.e. evaluations of the proper airspeed and the vertical speed that the rotorcraft will reach after a given lapse of time;

c) defining a first detection condition specifying when said associated predictive proper airspeed $V_{PP}$ and predictive vertical speed $v_{AP}$ are included in the instantaneous vortex domain; and d) triggering a signaling alarm when said first detection condition is satisfied.

Before describing the process whereby the predictive proper airspeed $V_{PP}$ and the predictive vertical speed $v_{AP}$ are obtained, it is important to understand that a vortex domain is associated with the plane of the rotorcraft rotor, its vertical speed is measured relative to a vertical line, i.e. a line on which gravity acts, and its proper airspeed is measured in the direction of its flight path, i.e. is equal to its true airspeed if it is in level flight (flying in a horizontal plane).

In this context, it should be understood that the vertical speed of an aircraft, and consequently that of the rotorcraft, is measured by a vertical speed indicator. Its true airspeed is deduced from an airspeed indicator that indicates a rectified airspeed, also known as calibrated airspeed and referenced below as VC.

It is then accepted that the following applies:

$$VC = V_P \sqrt{\sigma}$$

where the term $\sigma$ (relative density of the air) is equal to the quotient of the density $\rho$ of the air at the altitude under consideration divided by the density $\rho_0$ of air at ground level in a standard atmosphere.

Furthermore, in order to understand the invention properly, it is also appropriate to recall that a rotorcraft flies in translation at a forward speed that increases with increasing shift of the cyclic stick (control for controlling the cyclic pitch of the blades) towards the front of the rotorcraft: this gives rise to a longitudinal cyclical variation in the pitch of the blades that leads to the plane of the rotor being tilted forwards, with the attitude of the rotorcraft substantially following the tilt of the rotor.

That said, it will be readily be understood that when the plane of the rotor is at a small angle relative to a horizontal plane, i.e. during stages of flight with little horizontal acceleration, it is legitimate to assume that the system of axes applying to the instantaneous vortex domain (rotor axis) coincides with the system of axes applying to horizontal and vertical speeds. This assumption does indeed apply and corresponds to what generally occurs under circumstances known as "quasi-vertical descent vortex" conditions. The person skilled in the art refers to such a vortex domain as being "static", which assumes that the attitude of the rotor plane and the attitude of the rotorcraft are both substantially at an angle of zero.

Although such circumstances can indeed apply, they are nevertheless not very common since they do not correspond to conventional use of a rotorcraft.

Consequently, the person skilled in the art also defines in parallel a vortex domain that is "dynamic". Entering the dynamic vortex domain, i.e. in the presence of strong negative horizontal acceleration with the attitude of the rotor plane being at an angle of 20° (or more), and consequently with there being a difference of 20° or more between the two above-defined systems of axes, is just as dangerous and can occur during any landing with a downward vertical speed and a large amount of horizontal deceleration, where this situation is sometimes made worse by a small amount of tail wind.

Thus, an instantaneous vortex domain of the static type is defined essentially by a single domain represented in the system of axes associated with the plane of the rotor at an attitude angle that is substantially zero, whereas an instantaneous vortex domain of the dynamic type can comprise a plurality of vortex domains associated with the plane of the rotor, each vortex domain corresponding to a given attitude angle and being represented by a diagram in the system of axes associated with the plane of the rotor (abscissa axis and ordinate axis corresponding respectively to the tangential and the normal components of the speed of air relative to the plane of the rotor). Naturally, for any given attitude angle of the plane of the rotor for which a vortex domain has not been established, interpolation can be performed relative to two immediately adjacent angles of attitude, preferably on opposite sides, otherwise it is necessary to perform extrapolation.

Consequently, the use of an instantaneous vortex domain of the static type corresponds to a first implementation of the invention.

A second implementation relates to using an instantaneous vortex domain of the dynamic type.

Advantageously, the predictive vertical speed $v_{AP}$ is obtained during step b) by performing the following additional steps:

b1) measuring the instantaneous vertical speed v of the rotorcraft;

b2) determining a corrective vertical speed $v_{CORR}$ depending on a predictive term; and b3) adding the corrective vertical speed to the instantaneous vertical speed to obtain said predictive vertical speed $v_{AP}$.

As mentioned above, the instantaneous vertical speed v of the rotorcraft is provided by a vertical speed indicator.

Furthermore, during step b2), in a step b21), a first correction is determined for the measurement of the instantaneous vertical speed v as a function of the instantaneous proper airspeed $V_P$, the predictive proper airspeed $V_{PP}$, the minimum-power speed $V_Y$, the instantaneous vertical speed v as measured by a vertical speed indicator, and a constant k that is characteristic of a rotorcraft of a given type of rotorcraft.

This characteristic constant k is determined by testing and on the basis of a linear approximation that corresponds to a proportionality ratio between powers and the vertical speed of the rotorcraft, independently of the mass of the rotorcraft, given by:

$$v = k\left(\frac{W}{W_n} - 1\right)$$

with the approximation:

$$\frac{W_n}{WV_Y} = 2 - \frac{V_P}{V_Y}$$

In these relationships, $Wv_Y$ and $W_n$ designate the powers needed to fly level respectively at the minimum-power speed $V_Y$ and at the proper speed $V_P$, and W designates the instantaneous power available from the rotorcraft.

On this basis, and initially, a predictive term is determined that is applicable to the instantaneous vertical speed v and that is given by:

$$C_{P1} = (v+k)\frac{V_{PP} - V_P}{2V_Y - V_{PP}}$$

In the context of this first correction, it is possible optionally to provide a second operation during a step b21') of weighting the predictive term by means of a first weighting coefficient A that has been determined by testing relating to each type of rotorcraft. This first weighting coefficient is generally close to unity.

The weighted predictive term $C_{PP1}$ is thus written:

$$C_{PP1} = A \times C_{P1}$$

In theory there is no need to include this first weighting coefficient, since it is theoretically equal to unity.

However, specific rotorcraft may depart a little from theory. Consequently, the invention allows for testing to determine a value for this first weighting coefficient, which value may differ slightly form unity.

The sign "×" corresponds to the multiplication symbol.

Under such conditions, the first correction to the measured instantaneous vertical speed v is equal either to the predictive term $C_{P1}$ or to the weighted predictive term $C_{PP1}$.

It is important to observe that this first correction ($C_{P1}$ or $C_{PP1}$) is applicable only providing the following two conditions are satisfied:

the calibrated airspeed VC in level flight is less than the speed $V_Y$ which is close to 65 knots (kt); and the calibrated airspeed VC is decreasing.

With a rotorcraft, a first speed regime is defined that applies when the calibrated airspeed VC of the rotorcraft is greater than its minimum-power speed $V_Y$. This regime is characterized by power increasing with increasing airspeed and it corresponds to flight that is stabilized.

In contrast, a second speed regime applies below said minimum-power speed. This regime is characterized by instability of rotorcraft flight. In this second speed regime, the calibrated airspeed is low and power increases with decreasing rotorcraft speed. Airspeed indicator measurements are then less and less reliable as the forward speed of the rotorcraft decreases. In addition, the instantaneous vertical speed as measured is approximate because of the delay due to the inertia of a vertical speed indicator.

The method of the present invention may further include, during step b2), a step b22) during which a second correction is determined for the instantaneous vertical speed v, as given by:

$$C_{P2} = V_P \frac{dV_P}{dt}$$

which by definition opposes the variation in altitude $$\frac{dh}{dt}$$

of the rotorcraft because of the relationship:

$$\frac{dh}{dt} = -V_P \frac{dV_P}{dt}$$

that is obtained by differentiating the expression for the energy balance that is assumed to be constant during the reduction in the speed of the rotorcraft from the minimum-power speed $V_Y$ down to hovering flight, i.e.:

$$\frac{1}{2}mV_P^2 + mgh + \int W_n + \int W = CT$$

in which m, h, and g designate respectively the mass of the aircraft, its altitude in flight, and the acceleration due to gravity, CT being a constant and the powers $W_n$ and W remaining constant.

Under such conditions, the instantaneous acceleration of the aircraft $$\frac{dV_P}{dt}$$

is advantageously obtained from an acceleration measurement, e.g. produced by an accelerometer arranged along the longitudinal axis of the rotorcraft, since that is more accurate than the result obtained by processing pressure measurements at low speed.

In the context of this second correction, provision may optionally be made subsequently, during a step b22') to weight the corrective term by a second weighting coefficient B that is substantially equal to 0.5.

The weighted corrective term $C_{PP2}$ is then written:

$$C_{PP2} = B \times C_{P2}$$

The second weighting coefficient is set arbitrarily to 0.5.

However, it can be refined by testing, depending on the desired sensitivity.

Consequently, the second correction of the measurement of the instantaneous vertical speed v is equal either to the corrective term, or to the weighted corrective term.

More precisely, this second correction is for compensating possible wrong interpretations of the indications given by a vertical speed indicator and relating to a phenomenon known as "uplift".

When the pilot causes the rotorcraft to take up a nose-up attitude, even if only very little, and possibly instinctively, without simultaneously changing the instantaneous engine power (energy) of the rotorcraft, the vertical speed indicator begins by indicating a vertical speed that is positive.

Thus, in the short term, the longitudinal attitude angle of the fuselage increases and the rotorcraft tends to rise. However, the total energy of the rotorcraft is the sum of its kinetic energy and its potential energy. Since the power is being kept constant, as potential energy increases, kinetic energy decreases, and so the rotorcraft slows down.

Unfortunately, the pilot remains unaware of this loss of speed of the rotorcraft since the pilot believes the rotorcraft to be benefiting from the natural uplift phenomenon. The pilot therefore does not remedy this loss of speed by increasing rotorcraft power.

Furthermore, this speed reduction in the second speed regime is accompanied, as mentioned above, by an increase in the power accurately required.

Under such circumstances, the vertical speed drops off suddenly so as to become strongly negative, since the pilot has not increased power as is required because of the decrease in forward speed. The rotorcraft thus begins to drop rapidly, or even dangerously, in a manner that cannot be foreseen by the pilot since, only a few instants previously, the vertical speed indicator was indicating a positive vertical speed (upward speed).

Insofar as firstly the first correction is applied alone, and secondly the first and second corrections are applied simultaneously, the corrective vertical speed $V_{CORR}$ always depends on the predictive term $C_{P1}$ and takes one of the following forms:

$V_{CORR} = C_{P1}$ or $V_{CORR} = C_{PP1}$ or $V_{CORR} = C_{P1} + C_{P2}$ or $V_{CORR} = C_{P1} + C_{PP2}$ or $V_{CORR} = C_{PP1} + C_{P2}$ or $V_{CORR} = C_{PP1} + C_{PP2}$

Consequently, and depending on circumstances, the predictive vertical speed $v_{AP}$, used in step b3) and presented to the pilot is, given by:

$V_{AP} = V + C_{P1}$ or $V_{AP} = V + C_{PP1}$ or $V_{AP} = V + C_{P1} + C_{P2}$ or $V_{AP} = V + C_{P1} + C_{PP2}$ or $V_{AP} = V + C_{PP1} + C_{P2}$ or $V_{AP} = V + C_{PP1} + C_{PP2}$

Preferably, the predictive proper speed $V_{PP}$ is given by the relationship:

$$V_{PP} = V_P + \frac{dV_P}{dt}\Delta t$$

with a time interval $\Delta t$ that is advantageously equal to 10 seconds.

This condition leads to writing the proper speed as predicted for 10 seconds hence as follows:

$$V_{P10} = V_P + \left(10 \times \frac{dV_P}{dt}\right)$$

By way of example, the predictive vertical speed for 10 seconds hence is then written as follows in the more general case:

$$v_{AP} = v + A\left[(v+k)\frac{V_{PP} - V_P}{2V_Y - V_{PP}}\right] + B\left(V_P\frac{dV_P}{dt}\right)$$

i.e. if $\Delta t = 10$ seconds:

$$v_{AP} = v + A(v_{10} - v) + B\left(V_P\frac{dV_P}{dt}\right)$$

where:

$$v_{10} = v + (v+k)\frac{V_{P10} - V_P}{2V_Y - V_{P10}}$$

$v_{10}$ being the predictive vertical speed v for 10 seconds hence, without taking account of the corrective term or of the weighted corrective term.

Determining the instantaneous proper speed $V_P$ in application of at least three variants, each applicable to both implementations of the invention, serves in particular to mitigate the loss of sensitivity at low speed of an airspeed indicator.

In a first variant of the invention, the instantaneous proper speed is measured using an instrument known as an omnidirectional air data system (ODAS), e.g. as used in military helicopters such as the UH60 or a similar device implemented on the "Dauphin™ Coast Guard" helicopter developed by the Applicant.

The device has two Pitot tubes placed on two opposite arms of a rotary antenna that is centered on the axis of rotation of the main rotor, above the plane of the blades.

Such a device presents sensitivity that is more or less constant and can provide both components of airspeed in the plane of rotation of the device, excluding the third component.

The second variant measures the speed of an aircraft, in particular a rotorcraft at low speed, by using the airspeed indicator described in document FR 06/07239 in the name of the Applicant.

That instrument comprises an arm rotating at constant speed and provided with two pressure probes, each disposed at a respective one of its ends, each probe having two pressure intakes disposed symmetrically about the plane of rotation of said arm, thus giving access to all three components of the speed relative to the air.

Consequently, with either of those two devices such a pressure measuring type of airspeed indicator is no longer a limiting factor in terms of measuring static and total pressures at low speeds, so the proper speed of the rotorcraft can be obtained with good accuracy while advancing at low speed.

The third variant is based on an assumption that the wind does not change in magnitude or in direction while the speed of the rotorcraft is slowing from the minimum-power speed $V_Y$ down to hovering flight.

It is easy to determine wind speed at a calibrated airspeed faster than the minimum-power speed, since in that first speed regime, and as mentioned above, information from an airspeed indicator is reliable. An airspeed indicator thus gives the calibrated airspeed VC and the proper speed $V_P$ after making the barometric correction as follows:

$$V_P = \frac{VC}{\sqrt{\sigma}}$$

However, at low speeds (VC<$V_Y$) and with ordinary present-day equipment, the only reliable ground speed measurement that is presently available is that provided by a global positioning system (GPS). The speed $V_P$ can therefore no longer be the result of an air pressure measurement relating to the calibrated airspeed VC as delivered by an airspeed indicator.

In the invention, and under such circumstances, the wind $\vec{V}_W$ at the time the speed drops below $V_Y$ is determined by vector subtraction of the ground speed provided by the GPS from the speed $\vec{V}_P$ provided by the airspeed indicator measurement. The speed $\vec{V}_W$ is assumed to remain constant during the rotorcraft approach, during which approach its speed drops from $V_Y$ to zero, such that the proper speed $\vec{V}_P$ is then estimated as being equal to the vector sum $\vec{V}_S + \vec{V}_W$, where $\vec{V}_S$ is the instantaneous ground speed as obtained from the GPS throughout the second speed regime. The corresponding calibrated airspeed VC is thus equal to $V_P\sqrt{\sigma}$.

The proper speed $V_P$ of the rotorcraft is thus obtained regardless of its ground speed. Nevertheless, it should be observed that the proper speed $V_P$ as determined in this third variant of the invention is essentially two-dimensional because the ground speed provided by the GPS is likewise two-dimensional.

The invention also provides a device for detecting and signaling the "instantaneous" vortex domain in rotorcraft of a given type of rotorcraft, the device implementing the above-described method comprising:
  first means for measuring the instantaneous vertical speed v of the rotorcraft;
  second means for measuring the instantaneous proper airspeed $V_P$ of the rotorcraft;
  third means constituting a database relating to representing at least one instantaneous vortex domain by means of a diagram in a system of axes associated with the plane of the rotor and such that the abscissa and ordinate axes correspond respectively to components of the airspeed that are tangential and normal to said plane of the rotor of the rotorcraft;
  fourth means connected by first, second, and third connections 11, 12, and 13 respectively to the first, second, and third means, the fourth means being designed to:
    calculate in real time the predictive vertical speed $v_{AP}$ of the rotorcraft;
    calculate in real time the predictive proper airspeed $V_{PP}$ of the rotorcraft associated with the predictive vertical speed $v_{AP}$;
    detecting whether the pair comprising the predictive vertical speed and the associated predictive proper airspeed lies within the instantaneous vortex domain; and
    triggering an alarm if said pair comprising the predictive vertical speed and the associated predictive proper airspeed is detected as lying within the instantaneous vortex domain.
  Under such conditions, fifth means connected by a connection 14 to the fourth means signals the alarm to the pilot of the rotorcraft.

In a first embodiment of the invention, the instantaneous vortex domain is of the static type such that the only diagram representative of the corresponding vortex state and established in the above-mentioned system of axes (associated with the plane of the rotor) relates to an attitude angle of the plane of the rotor that is substantially zero.

In the second embodiment, the instantaneous vortex domain is of the dynamic type. Consequently, the third means has a plurality of diagrams representative of a corresponding number of vortex states, each diagram corresponding to a given attitude for the plane of the rotor.

Insofar as the device of the invention makes use of an instantaneous vortex domain of the dynamic type, it is necessary to implement the device by using sixth means for measuring said rotor attitude, which is assumed to be the same as the attitude of the rotorcraft, as mentioned above. The fourth means then respond to the third means to determine the instantaneous vortex domain associated with said measured attitude.

The sixth means are connected by a connection 16 to said fourth means.

Furthermore, and optionally, the device may include seventh means, connected via a connection 17 to the fourth means, for the purpose of measuring the instantaneous acceleration of the rotorcraft, so as to calculate the above-explained corrective term or weighted corrective term.

Advantageously, it should be observed that:
  the first means are constituted by a vertical speed indicator;
  the second means are advantageously, but not exclusively, either an airspeed indicator in two of the above-mentioned variants, or a GPS in the third variant. Under such circumstances, the proper airspeed corresponds to the vector sum of the speed provided by the GPS and the wind speed obtained by taking the difference between the proper speed and the speed given by the GPS when the calibrated airspeed was equal to the minimum-power speed;
  the fourth means comprise a calculator;
  the fifth means comprise an audible or visible alarm, or any other equivalent means such as an indicator with appropriate symbology, for example;
  the sixth means comprise an artificial horizon; and
  the seventh means comprise an accelerometer.

Furthermore, it is recalled that the third means contain in memory predetermined values for the minimum-power speed $V_Y$ and for a characteristic coefficient k, which values are constants for a rotorcraft of a given type of rotorcraft.

Thus, in the invention and contrary to existing prejudices, it is possible to manage the limits of the flight domain of a rotorcraft, and in particular to avoid or delay entry into the vortex ring state (VRS).

The invention and its advantages appear in greater detail from the following description showing preferred embodiments that are given without any limiting character and that are described with reference to the accompanying figures, in which:

Elements that are present in more than one of the figures are given the same reference in all of them.

MORE DETAILED DESCRIPTION

Figure 1:
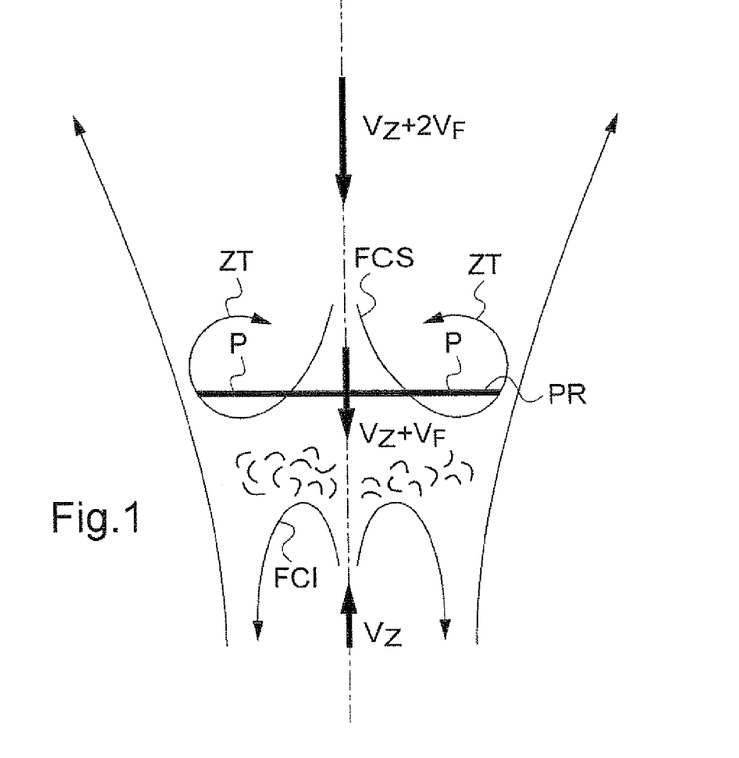
FIG. 1 shows the flow of air in the presence of a rotorcraft rotor in a vortex state.

The directions of the airspeeds shown in FIG. 1 correspond to a rotorcraft descending slowly and almost vertically. The speed $V_Z$ designates the component of the speed of the air flow that is normal to the plane of the rotor PR, and the value $V_F$, known as the "Froude" speed or as the downwash velocity is, in this situation, greater than $V_Z$.

It can be seen that a wake S forms under the rotor, thereby constraining the top central streamlines of air FCS to create a vortex zone ZT towards the periphery of the blades P.

Under such conditions, this vortex state phenomenon as manifested in principle by vibration that is felt by the crew, begins when the rotorcraft starts to descend (vertically or equally well at a steep downward slope), the rotor then sinking into its own wash and thus losing lift because it is isolated from the flow of air. Unless a corrective maneuver is undertaken, this will lead to a sudden drop.

To remedy this dangerous drawback, which is specific to rotorcraft, the Applicant proposes a method and a device that, unexpectedly, perform predictive functions of detecting and signaling the approach of a vortex state. Under such circumstances, the rotorcraft pilot can take the necessary measures, acting in anticipation of said approach, and thus preventing the rotorcraft entering into a vortex state.

Figure 2:
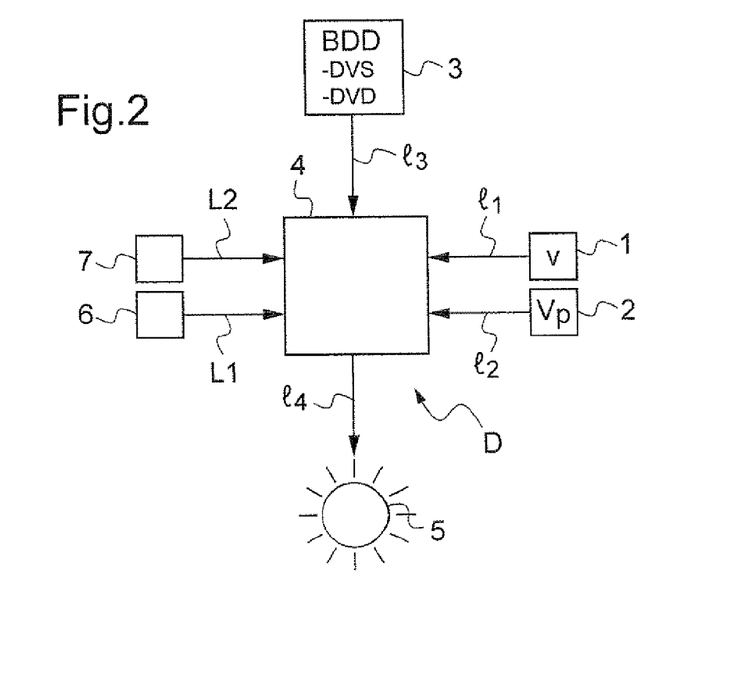
FIG. 2 is a diagram for describing the device of the invention.

The device D of FIG. 2 and in accordance with the invention comprises, for this purpose:

first means 1 for measuring the instantaneous vertical speed v of a rotorcraft, said first means advantageously being constituted by a vertical speed indicator;

second means 2 for measuring the instantaneous proper airspeed $V_P$ of the rotorcraft, said second means preferably corresponding to one of the following three variants:

an airspeed indicator in the above-mentioned first and second variants; or a GPS in the third above-mentioned variant, for which the proper airspeed corresponds to the vector sum of the speed provided by the GPS plus the wind speed as obtained by taking the difference between the proper speed and the speed provided by the GPS when the calibrated airspeed VC was equal to or greater than the minimum-power speed $V_Y$; naturally, it is possible to envisage any other instrument for measuring proper speed, without thereby going beyond the ambit of the present invention;

third means 3 comprising a database BDD relating to representing at least one instantaneous vortex domain by means of a diagram in a system of axes associated with the plane of the rotor and such that the abscissa axis and the ordinate axis correspond respectively to the airspeed components that are tangential and normal to the plane of the rotorcraft rotor;

fourth means 4 constituted by a calculator connected via first, second, and third connections 11, 12, and 13 respectively to the first, second, and third means, the fourth means being designed to:

calculate in real time the predictive vertical speed $v_{AP}$ of the rotorcraft;

calculate in real time the predictive proper airspeed $V_{PP}$ of the rotorcraft associated with the predictive vertical speed $v_{AP}$;

detect whether the pair constituted by the predictive vertical speed and the associated predictive proper airspeed is included within an instantaneous vortex domain; and signal an alarm if said pair constituted by the predictive vertical airspeed $V_{PP}$ and the associated predictive vertical speed $v_{AP}$ is detected as lying within the instantaneous vortex domain;

fifth means 5 for signaling said alarm, the fifth means being connected to the fourth means 4 via a connection 14, and being constituted by an audible alarm, a visible alarm, or any other alarm such as an indicator with appropriate symbology, for example.

Optionally, the device D may further comprise:

sixth means 6 relating to the presence of an artificial horizon, connected by a connection L1 to the fourth means 4 so as to select a diagram that is representative of the dynamic vortex domain relating to the measured attitude of the rotor plane, practically the same as the attitude of the rotorcraft, i.e. so as to determine the instantaneous vortex domain that corresponds to said measured attitude, where necessary by interpolating or extrapolating from other defined diagrams for other attitudes of said plane for the rotor, or indeed by making use of the diagram that relates to the attitude for the plane of the rotor that is closest to the measured attitude; and seventh means 7 connected via a connection L2 to the fourth means 4 so as to determine the instantaneous acceleration $$\frac{dV_P}{dt}$$

of the rotorcraft in order to correct, where appropriate, for so-called "uplift" effects, said seventh means preferably being constituted by an accelerometer.

Furthermore, it is recalled that the fourth means 4 contain in memory, firstly predetermined values for the minimum-power speed $V_Y$ and a characteristic coefficient k that are constant for a rotorcraft of a given type of rotorcraft, and secondly the constant values A and B that are adjustable as a function of requirements.

It is recalled that the device has at least two embodiments, the first and second embodiments corresponding to using the third means 3 respectively on the basis of an instantaneous vortex domain of the static type (only one diagram representative of the instantaneous vortex domain relating in principle to an attitude angle or the plane of the rotor that is substantially zero), or of the dynamic type (having a plurality of diagrams, each relating to an attitude for the plane of the rotor that represents some particular instantaneous vortex domain).

Figure 3:
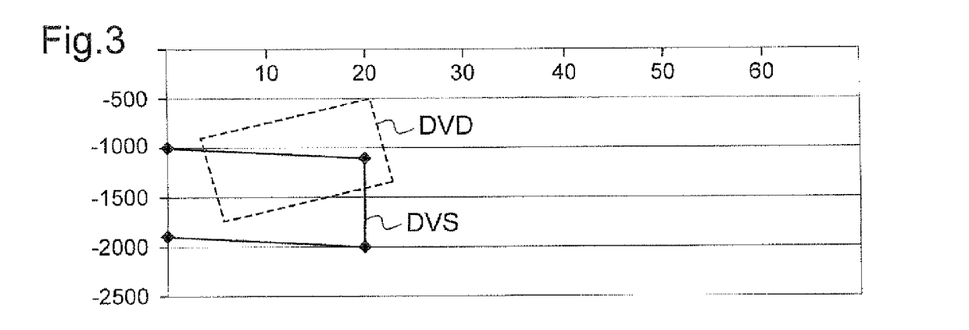
FIG. 3 shows how a vortex state is represented in a diagram.

By way of illustration, FIG. 3 shows an instantaneous vortex domain of the static type in the form of a diagram DVS, whereas the diagram DVD corresponds to an instantaneous vortex state selected from a plurality of diagrams representative of a vortex domain of the dynamic type. The abscissas and the ordinates represent the components of the flow speed of air respectively in the plane of the rotor (expressed in knots) and normal to said plane (expressed in feet per minute (ft/min)).

Specifically, the diagrams in FIG. 3 relates to an Ecureuil AS 350 helicopter manufactured by the Applicant. That aircraft is in the vortex zone if a pair of values for proper airspeed and associated vertical speed lies within the static vortex domain DVS (attitudes of the rotor plane and of the rotorcraft substantially identical). The same applies for the dynamic vortex domain, specifically if such a pair of values lies within the diagram DVD for the attitude associated with the plane of the rotor. In this example, the diagram DVD corresponds to an attitude for the plane of the rotor of about 22° showing one possible way in which the DVS domain can change into the DVD domain depending on how the attitude of the plane of the rotor changes.

Naturally, as its diagram that is representative of the instantaneous vortex domain, the device can use:
  either a diagram representative of the static vortex domain; or else
  both a diagram representative of the static vortex domain and a plurality of diagrams representative of the dynamic vortex domain.

When the diagrams representative of a dynamic vortex domain are used, the instantaneous vortex diagram used for a measured attitude of the rotorcraft is then obtained:
  either by interpolation or extrapolation based on the plurality of diagrams that are available, each being associated with a respective attitude of the plane of the rotor; or else
  by selecting the diagram that relates to an attitude for the plane of the rotor that is closest to the attitude that has been measured.

The use of a dynamic vortex domain positions the proper predictive airspeed and the vertical speed relative to the components of the speed of the air flow, an assumption that is acceptable given the above-mentioned predictive nature and the resulting simplification.

Figure 4:
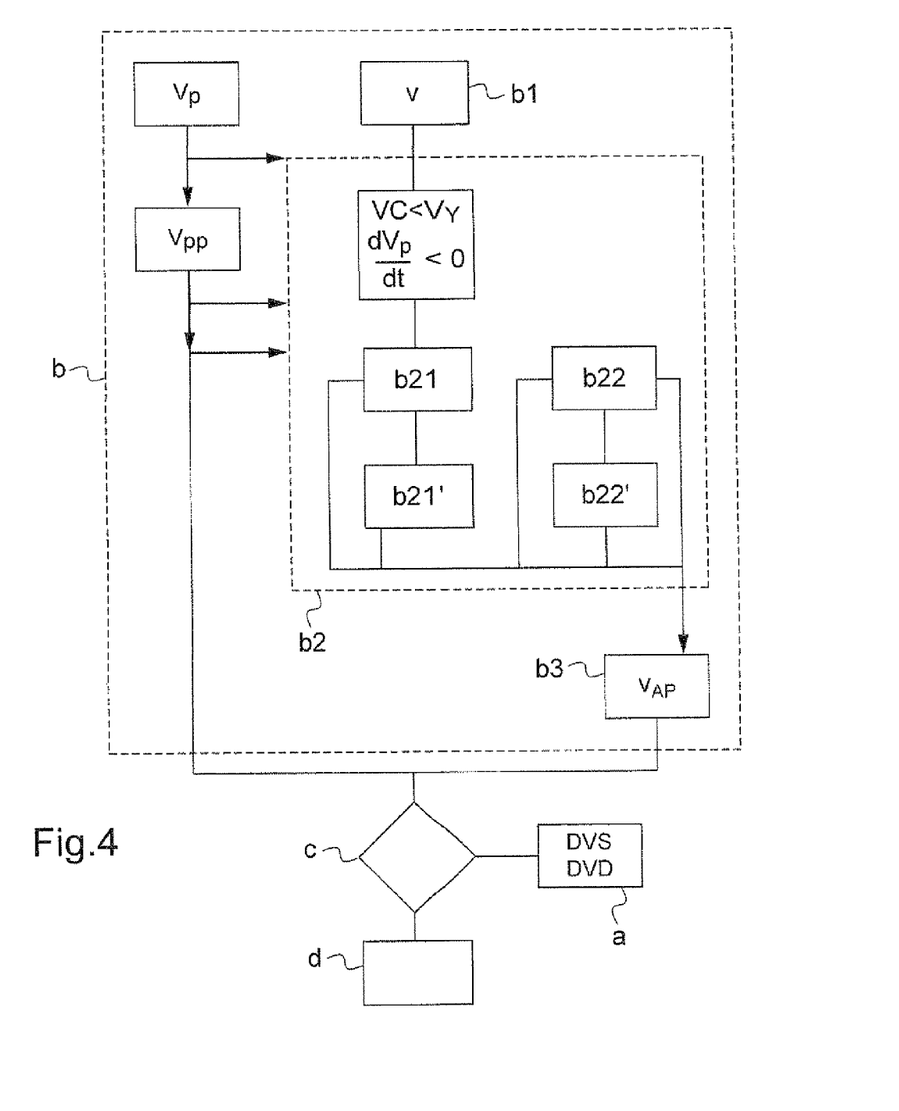
FIG. 4 is a block diagram showing the steps involved in performing the method of the invention.

Under such conditions, the device 1 implements the method shown diagrammatically in FIG. 4.

Thus, the method of detecting and signaling the vortex domain relating to a rotorcraft is remarkable in that the following steps are performed in succession:
  a) making a series of prior measurements on a reference rotorcraft of the particular type of rotorcraft during preliminary flights by measuring a plurality of pairs of values relating to the tangential and normal components of the speed of the flow of air relative to the plane of the rotor, these pairs of values determining at least one instantaneous vortex representative of a vortex state by means of at least one diagram in which the abscissa axis and the ordinate axis correspond respectively to said tangential and normal components;
  b) during flight of a rotorcraft of said particular type of rotorcraft, determining in real time a predictive proper airspeed $V_{PP}$ of said rotorcraft and an associated predictive vertical speed $v_{AP}$;
  c) defining a first detection condition specifying when said associated predictive proper airspeed $V_{PP}$ and predictive vertical speed $v_{AP}$ are included in the instantaneous vortex domain; and
  d) triggering a signaling alarm when said first detection condition is satisfied.

As explained above, the instantaneous vortex domain is represented by a diagram coming from a vortex domain that is either of the static type or else of the dynamic type, said diagram being such that the abscissas and the ordinates that correspond respectively to the tangential and normal components of the airspeed relative to the plane of the rotor.

Advantageously, the predictive vertical speed $v_{AP}$ is obtained during step b) by performing the following additional steps:
  b1) measuring the instantaneous vertical speed v of the rotorcraft;
  b2) determining a corrective vertical speed $V_{CORR}$ depending on a predictive term; and
  b3) adding the corrective vertical speed to the instantaneous vertical speed to obtain said predictive vertical speed $v_{AP}$.

In addition, in step b2), during a step b21), a first correction is determined for the measured instantaneous vertical speed v as a function of the vertical proper airspeed $V_P$, the predictive proper airspeed $V_{PP}$, the minimum-power speed $V_Y$, the instantaneous vertical speed v as measured by a vertical speed indicator, and a characteristic constant k for the rotorcraft of a given type of rotorcraft.

On this basis, and initially, a predictive term $C_{P1}$ applicable to the vertical speed v is determined, as given by:

$$C_{P1} = (v+k)\frac{V_{PP} - V_P}{2V_Y - V_{PP}}$$

In the context of this first correction, provision may optionally be made during a step b21') subsequently to weight the predictive term $C_{P1}$ by a first weighting coefficient A as determined by testing and specific to each type of rotorcraft. This first weighting coefficient is generally close to unity.

The weighted predictive term $C_{PP1}$ is thus written:

$$C_{PP1} = A \times C_{P1}$$

Under such conditions, the first correction to the instantaneous vertical speed measurement v is equal either to the predictive term $C_{P1}$ or to the weighted predictive term $C_{PP1}$.

It is important to observe that this first correction ($C_{P1}$ or $C_{PP1}$) is applicable only if the following two conditions are satisfied:
  the calibrated airspeed VC in level flight is less than the speed $V_Y$ which is close to 65 kt; and
  the calibrated airspeed is decreasing.

The method of the present invention may further include, during step b2), a step b22) in which a second correction is determined for the instantaneous vertical speed v as given by:

$$C_{P2} = V_P \frac{dV_P}{dt}$$

which by definition opposes the altitude variation $$\frac{dh}{dt}$$

of the rotorcraft under the conditions explained elsewhere.

In the context of this second correction, provision may optionally be made subsequently, during a step b22'), to weight the corrective term by a second weighting coefficient B that is substantially equal to 0.5.

The weighted corrective term $C_{PP2}$ is thus written as follows:

$$C_{PP2} = B \times C_{P2}$$

Consequently, the second correction to the measured instantaneous vertical speed v is equal either to the corrective term or to the weighted corrective term.

Insofar as firstly the first correction is applied alone and secondly the first and second corrections are applied simultaneously, the corrective vertical speed $V_{CORR}$ satisfies one of the following formulae:

$V_{CORR}=C_{P1}$ or $V_{CORR}=C_{PP1}$ or $V_{CORR}=C_{P1}+C_{P2}$ or $V_{CORR}=C_{P1}+C_{PP2}$ or $V_{CORR}=C_{PP1}+C_{P2}$ or $V_{CORR}=C_{PP1}+C_{PP2}$

Consequently, and depending on circumstances, the predictive vertical speed $v_{AP}$ used in step b3) and presented to the pilot is either:

$V_{AP}=V+C_{P1}$ or $V_{AP}=V+C_{PP1}$ or $V_{AP}=V+C_{P1}+C_{P2}$ or $V_{AP}=V+C_{P1}+C_{PP2}$ or $V_{AP}=V+C_{PP1}+C_{P2}$ or $V_{AP}=V+C_{PP1}+C_{PP2}$

Preferably, the predictive proper airspeed $V_{PP}$ is determined by the relationship:

$$V_{PP} = V_P + \frac{dV_P}{dt}\Delta t$$

with a time interval $\Delta t$ advantageously equal to 10 seconds.

This condition leads to writing the proper airspeed forecast for 10 seconds hence as follows:

$$V_{P10} = V_P + \left(10 \times \frac{dV_P}{dt}\right)$$

By way of example, the vertical speed predicted for 10 seconds hence is then written as shown below in the most general case:

$$v_{AP} = v + A\left[(v+k)\frac{V_{PP} - V_P}{2V_Y - V_{PP}}\right] + B\left(V_P \frac{dV_P}{dt}\right)$$

i.e. if $\Delta t=10$ seconds:

$$v_{AC} = v + A(v_{10} - v) + B\left(V_P \frac{dV_P}{dt}\right)$$

where:

$$v_{10} = v + (v+k)\frac{V_{P10} - V_P}{2V_y - V_{P10}}$$

$v_{10}$ being the vertical speed v predicted for 10 seconds hence, without taking account of the corrective term or of the weighted corrective term.

Naturally, the present invention can be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

In order to improve the predictive speed precision, a specific fly-test is executed with the concerned rotorcraft, of a specific type, to determine precisely the first and second weighting coefficient A and B, instead of setting them with arbitrary values, 1 and 0.5 for example.

In practice, and according to a preferred protocol, said concerned rotorcraft moving noticeably at the minimum-power speed $V_Y$, and possibly in the process of evolutions at non-null instantaneous vertical speed, a test consists to reduce, from an instantaneous proper airspeed $V_P$ lower or equal than the minimum speed at a first time t, this forward speed of rotorcraft, always maintaining if possible the engine power constant. Moreover, the test is repeated by imposing to the rotorcraft in each test a level almost constant of deceleration, being understood that, on the one hand said level of deceleration can be modified from one test to another, and on the other hand many tests can be executed on a same level of deceleration, or from different instantaneous proper speed $V_P$ at time t.

Every level of deceleration is obtained by a longitudinal movement of the rotorcraft cyclic handle toward the rear end of the rotorcraft by the pilot. In these conditions, the result is a slope angle of the swashplate, and thus of the rotation plane of the rotor, in the pull-up direction towards the front of the rotorcraft.

This action imposes a deceleration to the concerned rotorcraft.

Besides, every test is followed by a time period of at least 10 seconds that is to say up to a second time (t+10 seconds), this period of 10 seconds being preferentially accepted to protect the predictive proper speed $V_{PP}$ then written as $V_{P10}$.

During every test, quantities measurements are recorded during at least 10 seconds as follows:

the instantaneous vertical speed v, at the beginning of the test at the first time t, the vertical speed v at the second time (t+10 seconds) equal de facto to the predictive vertical speed $V_{AP}$ at the second time (t+10 seconds), the instantaneous proper speed $V_P$ at the first time t, the deceleration $$\frac{dV_P}{dt}$$

knowing that quantities $V_Y$ and k are known as characteristics of said type of rotorcraft.

As a result, terms $C_{p1}$ and $C_{p2}$ are calculated for each test so that for each test it is established an equation like:

$(A \times C_{p1})+(B \times C_{p2})=V_{AP}-v$ where $V_{AP}$ is equal to the vertical speed v measured at the second time (t+10 seconds), and v is equal to the vertical speed v measured at the first time (t).

Therefore, there are as many equations as tests; the system of equations resulting being solved by classical numerical methods which is not necessary to describe presently.

The solution to this system of equations thus enables to obtain the first and second weighting coefficients A and B.

These weighting coefficients can be used equally with the help of the following relations, previously described, according to the considered species case:

$$V_{AP}=v+C_{PP1} \text{(coefficient } A \text{ only one used)}$$

$$V_{AP}=v+C_{PP2} \text{(coefficient } B \text{ only one used)}$$

$$V_{AP}=v+C_{P1}+C_{PP2} \text{(coefficient } B \text{ only one used)}$$

$$V_{AP}=v+C_{PP1}+C_{P2} \text{(coefficient } A \text{ only one used)}$$

$$V_{AP}=v+C_{PP1}+C_{PP2} \text{(coefficients } A \text{ and } B \text{ used)}$$

What is claimed is:

1. A method of detecting and signaling the approach of a vortex domain by a rotorcraft of a particular type of rotorcraft, wherein the following steps are performed in succession:
   a) making a series of prior measurements on a reference rotorcraft of the particular type of rotorcraft during preliminary flights by measuring a plurality of pairs of values relating to the tangential and normal components of the speed of the flow of air relative to the plane of the rotor, these pairs of values determining at least one instantaneous vortex representative of a vortex state by means of at least one diagram in which the abscissa axis and the ordinate axis correspond respectively to said tangential and normal components;
   b) during flight of a rotorcraft of said particular type of rotorcraft, determining in real time a predictive proper airspeed $V_{PP}$ of said rotorcraft and an associated predictive vertical speed $v_{AP}$;
   c) defining a first detection condition specifying when said associated predictive proper airspeed $V_{PP}$ and predictive vertical speed $v_{AP}$ are included in the instantaneous vortex domain; and
   d) triggering a signaling alarm when said first detection condition is satisfied;
   and wherein the predictive proper airspeed $V_{PP}$ is determined by means of the following relationship in which t and $\Box t$ designate respectively time and a time interval:

$$V_{PP} = V_P + \frac{dV_P}{dt}\Box t$$

the predictive vertical speed $v_{AP}$ being calculated by performing the following additional steps:
   b1) measuring the instantaneous vertical speed V of the rotorcraft;
   b2) determining a corrective vertical speed $v_{CORR}$ depending on a predictive term; and
   b3) adding the corrective vertical speed to the instantaneous vertical speed to obtain said predictive vertical speed $v_{AP}$;
   said predictive term applicable to the instantaneous vertical speed v being determined during a step b21) from the following equation:

$$C_{P1} = (v+k)\frac{V_{PP}-V_P}{2V_Y-V_{PP}}$$

with:
   $V_P$=the instantaneous proper airspeed of the rotorcraft of a given type of rotorcraft;
   $V_Y$=the predetermined minimum-power speed of the rotorcraft of a given type of rotorcraft; and
   k=a characteristic coefficient predetermined for the rotorcraft of a given type of rotorcraft;
   providing the following two conditions are satisfied:
   the calibrated airspeed VC in level flight is less than the minimum-power speed $V_Y$; and
   the calibrated airspeed VC is decreasing.

2. A method according to claim 1, wherein the instantaneous vortex domain is of the static type, being represented by a single diagram having as its abscissa and ordinate axes the components of the airspeed that are respectively tangential and normal to the plane of the rotor, said diagram further corresponding to a single attitude of said rotor plane, which attitude is substantially zero.

3. A method according to claim 1, wherein the instantaneous vortex domain is either of the static type, or else of the dynamic type, represented by a diagram selected from a plurality of diagrams relating to a plurality of attitudes for the plane of the rotor, including the attitude that is substantially zero, such that said selected diagram corresponds substantially to the measured attitude of said rotor plane and comprises as its abscissa and ordinate axes the components of the airspeed that are respectively tangential and normal to the rotor plane.

4. A method according to claim 3, wherein during an additional step b21'), a weighted predictive term $C_{PP1}$ is determined, where A is a first weighting coefficient, such that:

$$C_{PP1}=A \times C_{P1.}$$

5. A method according to claim 4, wherein the first weighting coefficient A is close to 1.

6. A method according to claim 1, wherein the corrective vertical speed $v_{CORR}$ is equal to the predictive term $C_{P1}$ such that the predictive vertical speed $v_{AP}$ is given by:

$$v_{AP}=v+C_{P1.}$$

7. A method according to claim 4, wherein the corrective vertical speed $v_{CORR}$ is equal to the weighted predictive term $C_{PP1}$, such that the predictive vertical speed $v_{AP}$ is given by:

$$V_{AP}=v+C_{PP1.}$$

8. A method according to claim 1, wherein, during step b2), in a step b22), a corrective term $C_{P2}$ is determined as follows:

$$C_{P2} = V_P \frac{dV_P}{dt}$$

where $V_p$ designates the instantaneous speed of the rotorcraft and $$\frac{dV_P}{dt}$$

its instantaneous acceleration, t being time.

9. A method according to claim 8 wherein, once a predictive term $C_{P1}$ has been determined during a step b21), the corrective vertical speed $v_{CORR}$ is equal to summing the corrective term $C_{P2}$ and the predictive term $C_{P1}$ such that the predictive vertical speed $v_{AP}$ is equal to:

$$v_{AP}=v+C_{P1}+C_{P2.}$$

10. A method according to claim 8, wherein, after determining a weighted predictive term $C_{PP1}$ in an additional step b21'), the corrective vertical speed $v_{CORR}$ is equal to summing the corrective term $C_{P2}$ and the weighted predictive term $C_{PP1}$ so that the predictive vertical speed $v_{AP}$ is given by:

$$v_{AP}=v+C_{PP1}+C_{P2}.$$

11. A method according to claim 8, wherein during an additional step b22'), a weighted corrected term $C_{PP2}$ is determined, where B is a second weighting coefficient, as follows:

$$C_{PP2}=B \times C_{P2}.$$

12. A method according to claim 11, wherein the second weighting coefficient B is substantially equal to 0.5.

13. A method according to claim 11, wherein, once the predictive term $C_{P1}$ has been determined during a step b21), the corrective vertical speed $v_{CORR}$ is equal to summing the predictive term $C_{P1}$ and the weighted corrective term $C_{PP2}$ such that the predictive vertical speed $v_{AP}$ is given by:

$$v_{AP}=v+C_{P1}+C_{PP2}.$$

14. A method according to claim 11, wherein, after a weighted predictive term $C_{PP1}$ has been determined in an additional step b21'), the corrective vertical speed $v_{CORR}$ is equal to summing the weighted predictive term $C_{PP1}$ and the weighted corrective term $C_{PP2}$ such that the predictive vertical speed $v_{AP}$ is given by:

$$v_{AP}=v+C_{PP1}+C_{PP2}.$$

15. A method according to claim 1, wherein the time interval □t is substantially 10 seconds.

16. A method according to claim 1, wherein the instantaneous vertical speed V is measured using a vertical speed indicator.

17. A method according to claim 1, wherein the acceleration $$\frac{dV_P}{dt}$$

is measured using an accelerometer arranged on the longitudinal axis of the rotorcraft.

18. A method according to claim 1, wherein the instantaneous proper airspeed $V_p$ is measured using an omnidirectional air data system.

19. A method according to claim 1, wherein the instantaneous proper airspeed $V_p$ is measured using an airspeed indicator having an arm rotating at constant speed, provided with two pressure probes each disposed at a respective one of the ends of said arm, each probe having two pressure intakes arranged symmetrically relative to the plane of rotation of the arm.

20. A method according to claim 1, wherein if the calibrated airspeed VC of the rotorcraft is less than the minimum-power speed $V_y$, the proper airspeed VP of said rotorcraft is calculated by obtaining the vector sum of the ground speed $\vec{V_S}$ as supplied by a GPS and the wind speed $\vec{V_W}$ as obtained by taking the difference between the proper airspeed given by an airspeed indicator and the speed given by the GPS when the calibrated airspeed VC is equal to the minimum-power speed $V_y$.

21. A method according to claim 1, wherein the attitude of the rotor is measured using an artificial horizon.

22. A device (D) for detecting and signaling the approach of a vortex domain by a rotorcraft, the device implementing the method according to claim 1, comprising:

first means (1) for measuring the instantaneous vertical speed V of the rotorcraft;

second means (2) for measuring the instantaneous proper airspeed $V_p$ of the rotorcraft;

third means (3) constituting a database (BDD) relating to representing at least one instantaneous vortex domain by means of a diagram in a system of axes associated with the plane of the rotor and such that the abscissa and ordinate axes correspond respectively to components of the airspeed that are tangential and normal to said plane of the rotor of the rotorcraft;

fourth means (4) connected by first, second, and third connections (11, 12, 13) respectively to the first, second, and third means, the fourth means being designed to detect the approach of a vortex domain by the rotorcraft; and fifth means (5) for signaling the approach of a vortex domain by the rotorcraft, the fifth means being connected to the fourth means (4) by a connection (14);

the fourth means (4) being a calculator designed in particular to:

calculate in real time the predictive vertical speed $v_{AP}$ of the rotorcraft;

calculate in real time the predictive proper speed $V_{PP}$ of the rotorcraft associated with the predictive vertical speed $V_{AP}$;

detect whether the pair of predictive vertical speed and the associated predictive proper airspeed lies within the instantaneous vortex domain; and an alarm if said pair of vortex proper airspeed $V_{PP}$ and associated predictive vertical speed $v_{AP}$ is detected within the instantaneous vortex domain.

23. A device (D) according to claim 22, including sixth means (6) connected via connection (L1) to the fourth means (4) so as to select a diagram representative of the dynamic instantaneous vortex domain relating to the attitude of the plane of the rotor as measured by said sixth means.

24. A device according to claim 22, including seventh means (7) connected via a connection (L2) to the fourth means (4) in such a manner as to determine the instantaneous acceleration $$\frac{dV_P}{dt}$$

of the rotorcraft.

25. A device according to claim 22, wherein the first means (1) is a vertical speed indicator.

26. A device according to claims 22, wherein the second means (2) is an omnidirectional air data system.

27. A device according to claim 22, wherein the second means (2) is an airspeed indicator comprising an arm rotating at constant speed, provided with two pressure probes, each disposed at a respective one of the ends of said arm, each probe having two pressure intakes disposed symmetrically about the plane of rotation of the arm.

28. A device according to claim 22, wherein the second means (2) is a GPS such that if the calibrated airspeed VC of the rotorcraft is less than the minimum-power speed $V_y$, the proper airspeed $V_P$ of said rotorcraft corresponds to the vector sum of the ground speed $\vec{V_S}$ provided by a GPS and the wind speed $\vec{V_W}$ obtained by taking the difference between the speed given by an airspeed indicator and the speed given by a GPS when the calibrated airspeed VC is equal to the minimum-power speed $V_y$.

29. A device according to claim 22, wherein the fifth means (5) is an audible alarm, a visible alarm, or an indicator provided with appropriate symbology.

30. A device according to claim 22, wherein the sixth means (6) is an artificial horizon.

31. A device according to claim 22, wherein the seventh means (7) is an accelerometer disposed on a substantially horizontal axis of the rotorcraft.

* * * * *

UNITED STATES PATENT AND TRADEMARK OFFICE
CERTIFICATE OF CORRECTION

| | | |
|---|---|---|
| PATENT NO. | : 7,907,066 B2 | Page 1 of 1 |
| APPLICATION NO. | : 12/238896 | |
| DATED | : March 15, 2011 | |
| INVENTOR(S) | : Bernard Certain | |

It is certified that error appears in the above-identified patent and that said Letters Patent is hereby corrected as shown below:

IN THE CLAIMS:

Column 17, Line 39, Claim 1:

After "which $\underline{t}$ and" Delete "☐t"
Insert -- $\Delta t$ --.

Column 17, Lines 40-44, Claim 1:
Delete:

" $V_{PP} = V_P + \dfrac{dV_P}{dt}$ ☐t "

and Insert

-- $V_{PP} = V_P + \dfrac{dV_P}{dt} \Delta t$ --.

Column 19, Line 28, Claim 15:

After "wherein the time interval" Delete "☐t"
Insert -- $\Delta t$ --.

Column 20, Line 26, Claim 22:

Before "an alarm if said pair of vortex"
Insert -- signal --.

Signed and Sealed this
Twenty-second Day of May, 2012

David J. Kappos
*Director of the United States Patent and Trademark Office*